(No Model.)

J. DRAPER.
WALKING STICK.

No. 251,843. Patented Jan. 3, 1882.

Witnesses.
Lewis Tomlinson
H. H. Warren

Inventor.
John Draper
by Ridout, and Ko.
Att'y

UNITED STATES PATENT OFFICE.

JOHN DRAPER, OF WHITBY, ONTARIO, CANADA.

WALKING-STICK.

SPECIFICATION forming part of Letters Patent No. 251,843, dated January 3, 1882.

Application filed November 8, 1881. (No model.)

*To all whom it may concern:*

Be it known that I, JOHN DRAPER, of the town of Whitby, in the county of Ontario, in the Province of Ontario, Canada, have invented certain new and useful Improvements in Walking-Sticks, of which the following is a specification.

The object of the invention is to provide a walking-stick a portion of which is arranged to form a lamp within which the light will not be affected by the wind.

Figure 1:
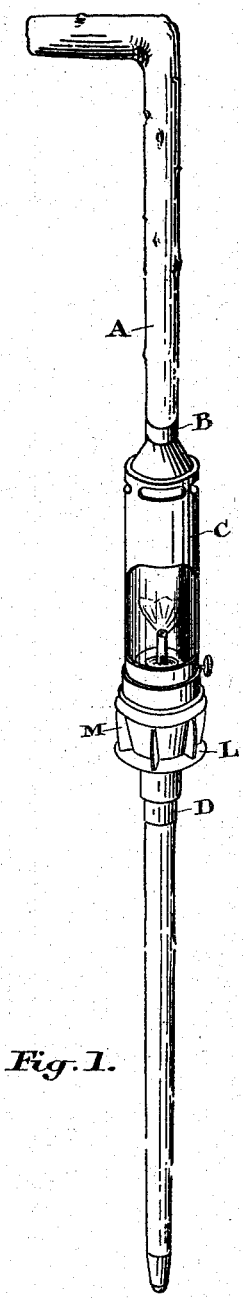
Figure 2:
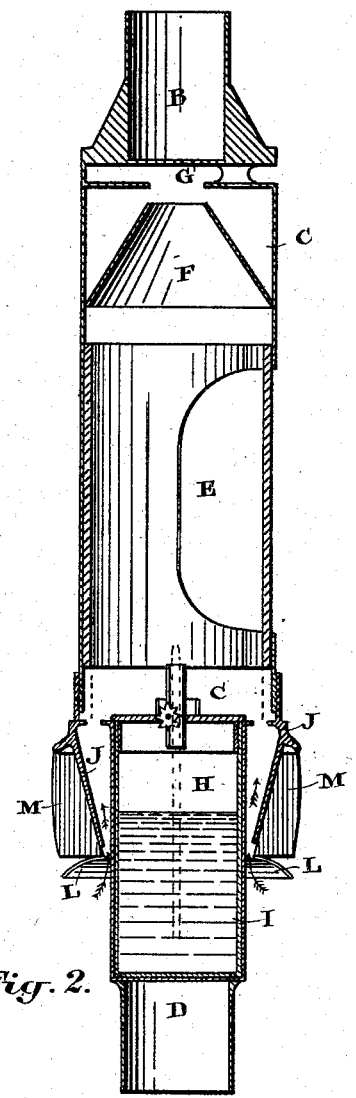

In the drawings, Figure 1 is an outside view of my illuminated walking-stick; and Fig. 2 is a similar view, showing the lamp portion of the stick in section.

In arranging the lamp applied to a walking-stick it is absolutely essential that provision should be made to prevent the light being affected by sudden gusts of wind. It is also necessary that the lamp should be arranged so that it will not make the stick clumsy or ungainly to handle.

In the drawings, A is the stick proper, the upper portion of which fits into a socket, B, formed on the top of the metallic case C. The lower portion of the stick A fits into a similar socket, D, formed in the bottom of the metallic case C. A portion of one side of the case C is cut away, so that the light within the casing may be seen through the glass E. This glass fits within the casing C, and either abuts up against a metallic cone-shaped top, F, or is formed with a similar top made of glass. Immediately over the top F a flat top is formed over the case, having a hole in it corresponding with that made in the cone-shaped top F. An open space between this latter top and the top G is formed, through which the heated gas from the lamp escapes.

H is the lamp, set within the bottom portion of the case C. This portion of the case is composed of a tube, I, made a proper size to receive the lamp H. This tube is surrounded by an outer casing, J, leaving between it and the casing an open air-space, into which air is admitted through openings formed in its bottom, as indicated by arrows, escaping from this space into the casing C, where it supplies the necessary oxygen to the burner. In order to protect these openings from any sudden gusts of air, a circular flange, I, is arranged around the base of the casing J. To further assist in this object, vertical wings M are provided, extending from the flange L to the top portion of the casing J, as indicated, with openings arranged in the base of the casing J, as described, protected by circular flange L and vertical wings M. It is practically impossible to extinguish the light by the ordinary movement of the stick, and similarly no sudden gust of air will affect the light. The arrangements of the cone-shaped top F, set, as shown, within a casing, C, prevent any sudden gusts of wind affecting the light by entering the top holes, as it will be seen a gust of wind entering from one side of the casing will pass into the chamber on the opposite side, formed between the top F and casing C.

What I claim as my invention is—

1. In a walking-stick having a metallic lamp-case inserted in it, as described, an outer casing, J, encircling the tube I, containing the lamp, and forming an air-space through which the air passes into the lamp, in combination with the vertical wings M and circular flange L, arranged around the casing J, for the purpose of protecting the air-openings, substantially as and for the purpose specified.

2. In combination with a walking-stick having a metallic lamp-case inserted in it, as described, the cone-shaped top F, situated within the case immediately below the top G, forming an air-space, substantially as and for the purpose specified.

JOHN DRAPER.

Witnesses:
  JAMES DRAPER,
  SARAH DRAPER.